(12) United States Patent
Lambrinos

(10) Patent No.: US 12,337,624 B2
(45) Date of Patent: Jun. 24, 2025

(54) EXERCISE TIRE

(71) Applicant: Jon Lambrinos, Campbell, OH (US)

(72) Inventor: Jon Lambrinos, Campbell, OH (US)

(73) Assignee: Maria Katsadas, Beaver, PA (US)

( * ) Notice: Subject to any disclaimer, the term of this patent is extended or adjusted under 35 U.S.C. 154(b) by 117 days.

(21) Appl. No.: 18/328,023

(22) Filed: Jun. 2, 2023

(65) Prior Publication Data
US 2023/0391138 A1 Dec. 7, 2023

Related U.S. Application Data

(60) Provisional application No. 63/349,287, filed on Jun. 6, 2022.

(51) Int. Cl.
*B60C 5/00* (2006.01)

(52) U.S. Cl.
CPC .......... *B60C 5/004* (2013.01); *B60C 2200/12* (2013.01)

(58) Field of Classification Search
CPC ......... B60C 5/004; B60C 5/005; B60C 19/12; B60C 5/20; B60C 5/02; B60C 5/025; B60C 5/04; B60C 5/08
See application file for complete search history.

(56) References Cited

U.S. PATENT DOCUMENTS

| | | | |
|---|---|---|---|
| 6,279,631 B1 | 8/2001 | Tuggle | |
| 6,431,235 B1 | 8/2002 | Steinke | |
| 10,391,815 B2 | 8/2019 | Peterman | |
| 2003/0025382 A1* | 2/2003 | Johnson | F16F 15/363 301/53.5 |

FOREIGN PATENT DOCUMENTS

SE 467693 * 8/1992

* cited by examiner

*Primary Examiner* — Justin R Fischer
(74) *Attorney, Agent, or Firm* — Harpman & Harpman

(57) ABSTRACT

A replacement exercise bike tire that will emulate the ride characteristics and effort of a conventional bike tire that is partially deflated. The increased roll resistance imparted by the exercise tire will enhance the bike rider's workout by imparting greater pedal effort required to ride. Multiple interconnected compartments within the tire body are filled with a high viscosity material that will displace under load as the tire rotates during use emulating a flat tire.

2 Claims, 3 Drawing Sheets

EXERCISE TIRE

This application claims the benefit of U.S. Provisional Application 63/349,287, filed Jun. 6, 2022.

BACKGROUND OF THE INVENTION

1. Technical Field

This invention relates to exercise workout equipment and devices that provide enhanced physical activity for the user as specifically to exercise bikes and equipment.

2. Description of Prior Art

Prior art devices of this type are directed to non-pneumatic bike tires that replace conventional pneumatic bike tires for increased durability and offroad use.

Examples of non-pneumatic tires can be seen in U.S. Pat. Nos. 6,279,631, 6,431,235 and 10,391,815.

U.S. Pat. No. 6,279,631 discloses a low-pressure tire having a flexible inelastic material to support the tire rim and contact surface.

U.S. Pat. No. 6,431,235 claims a non-pneumatic tire and rim combination having a tire body formed of urethane foam of a dense mass configuration.

U.S. Pat. No. 10,391,815 shows multiple layer foam insert for tires wherein a foam core emulates the effect of air pressure.

SUMMARY OF THE INVENTION

An exercise tire for non-stationary bikes that provides increased resistance during pedaling. The exercise tire replaces one or more conventional tires having a semi-inflated feature. Multiple interlinked interior compartments in the tire are filled with a displaceable non-compressible yielding viscous material that will displace under load. The exercise tire may have an air infill chamber about or separated from the inner linked interior compartments extending around the interior diameter of the tire body. Select self-sealing apertures may be provided to impart a combination of pneumatic air and viscous material filled component for support depending on the user requirement.

DETAILED DESCRIPTION OF THE INVENTION

Figure 1:
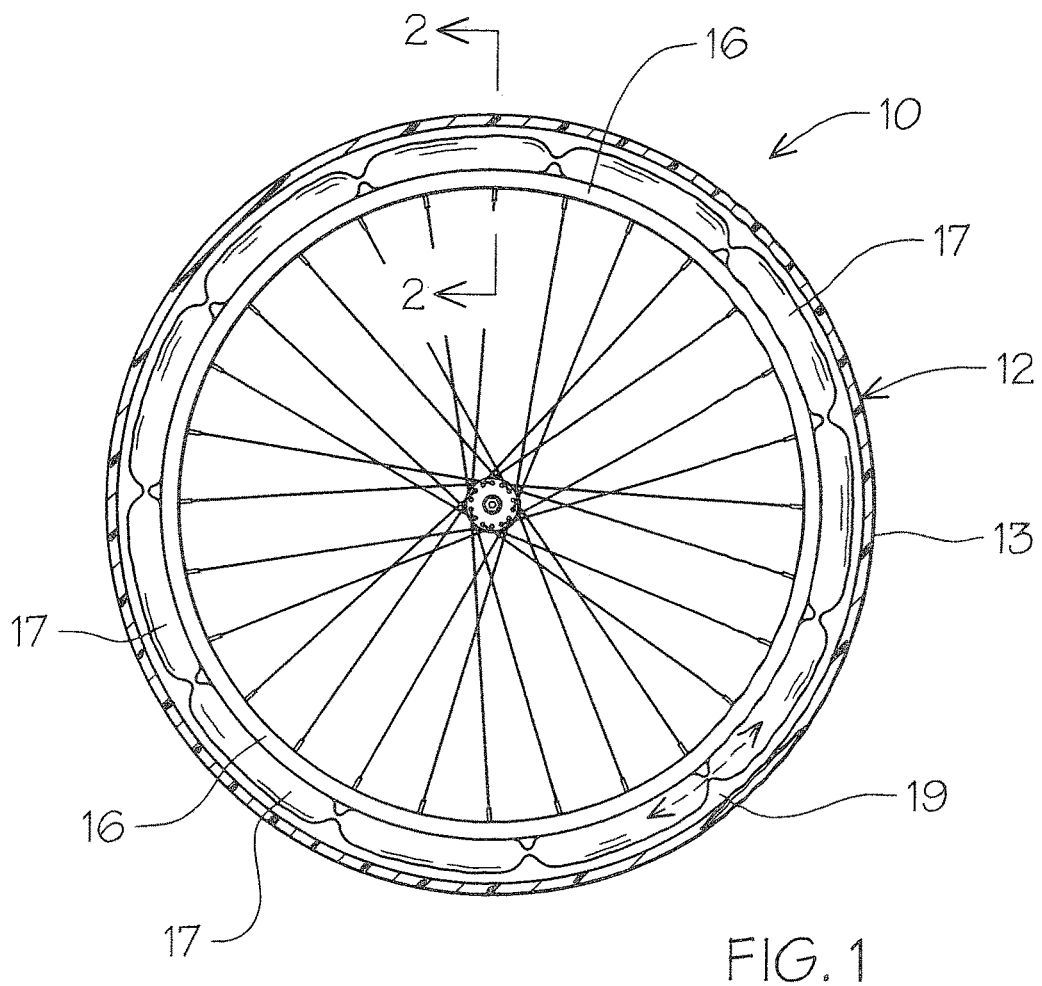
FIG. 1 is a sectional side elevational view of the exercise tire of the invention.
Figure 2:
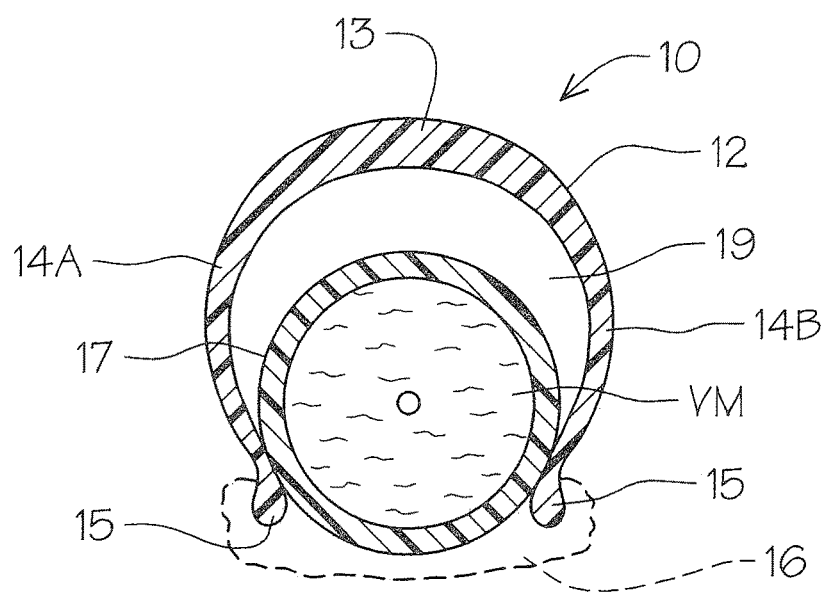
FIG. 2 is an enlarged cross-sectional view on lines 2-2 thereof.
Figure 3:
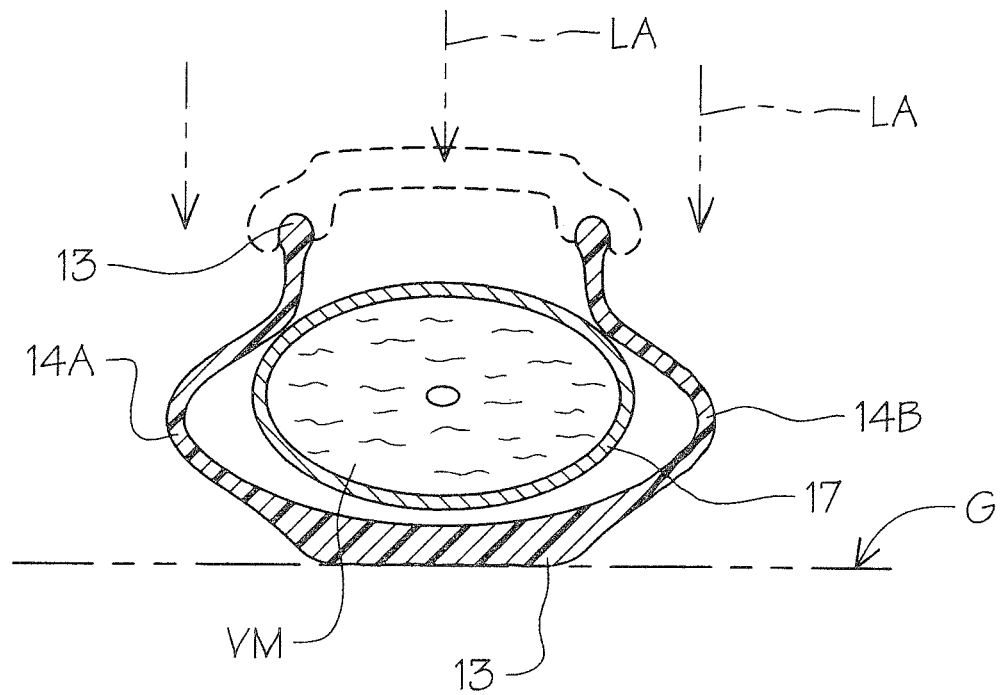
FIG. 3 is an enlarged cross-sectional view of the exercise tire under user imparted load.

Referring to FIGS. 1-4 of the drawings, an exercise bike tire 10 of the invention can be seen for use on a standard bicycle 11. The exercise bike tire 10 has an annular tire body 12 with a tread portion 13 and contoured depending annular sidewalls 14A and 14B. A tire bead 15 extends from the respective sidewalls 14A and 14B for sealing engagement with a standard bicycle tire rim 16 as shown in dotted lines in FIG. 2 of the drawings.

The exercise tire 10 has a plurality of inner linked non-compressible inserts 17 which in this example are configured as elongated inner linked chambers 18, each filled with a non-compressible viscous material VM.

The respective inserts will deform under applied pressure to the tire 10 as that of the weight of the rider (load), not shown, so as to allow the tire body 12 to deform as if flat during use. The tire body 12 may have an air chamber 19 there about for infill of air to effectively regulate the corresponding deformability of the tread 13 and sidewalls 14A and 14B under load and reduce the deformation of the viscous material VM filled insert 17 under load indicated by load arrows LA which is indicative of being applied by mounting and riding of the bicycle 11 by a user, not seen.

The exercise tire 10 of the invention may be used on any standard bicycle tire rim thus providing interchangeability and universality thereto. The transverse diameter of the non-compressible insert 17 may be varied so as to reduce or eliminate the air retaining dimensions within the bike tire depending on the venues and required use.

Figure 4:
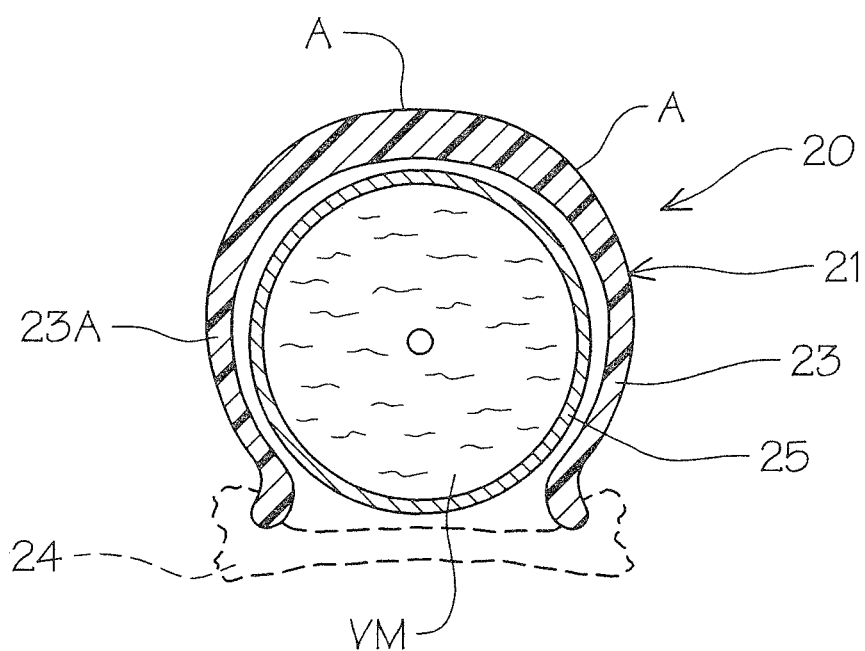
FIG. 4 is an enlarged cross-sectional alternate form of the exercise tire.
Figure 5:
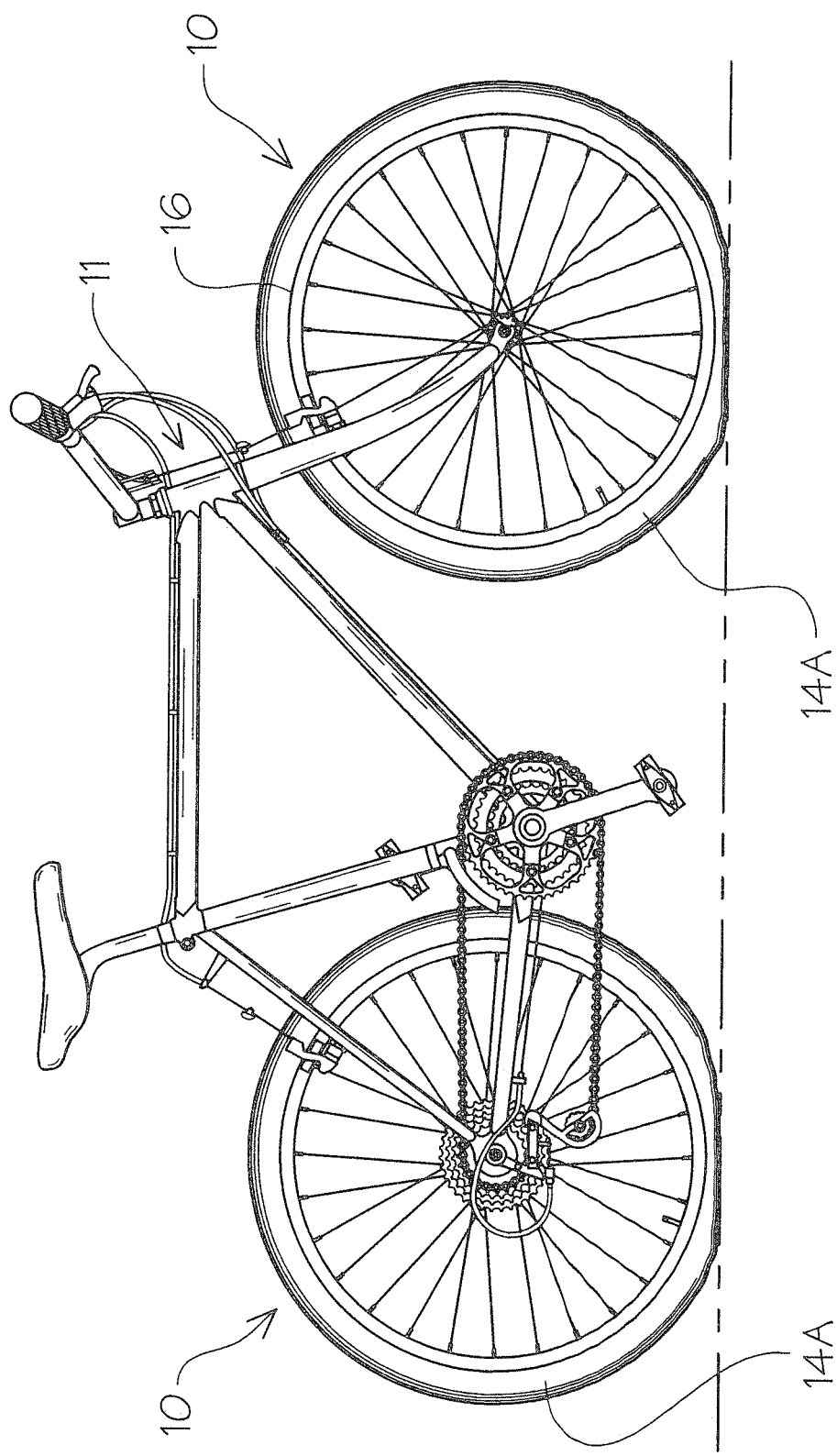
FIG. 5 is a graphic illustration of a bike under load with the exercise tire of the invention thereon.

Such an example can be seen in FIG. 4 of the drawings wherein an alternate exercise tire replacement 20 can be seen having typical tire body 21 with a tread portion 22 and depending opposed integral sidewalls 23A and 23B on a standard bike tire rim 24. A deformable non-compressible insert 25 of interconnected elongated chambers extends around and within the tire body 21. The insert 25 is of a larger transverse dimension filling more of the tire body 21 so as to be responsive to direct load onto the tread achieved during use.

Such an alternate configuration may have apertures A within the tire tread portion that assure direct force transfer from the tire body 23 under load as noted. Therefore, the insert 25 filled with a non-compressible viscous material VM will be directly engaged and distorted for increased tire resistance during rotation thus imparting a more difficult workout as if on a partially deflated or flat tire.

It will be seen that the different inserts 17 and 25 can be used thus varying the size and sectional separation of the interconnected insert chambers. The viscous material VM used for the insert chamber 17 and 25 filling may be one from a family of related materials inclusive of but not limited to synthetic resin compounds, water, sand and gel like materials, all capable of non-compressible distortion dependent on chamber configuration and interlinking properties.

It may also be possible to interconnect the respective chambers thereby providing viscous material displacement from each independent chambers during load thus increasing the effective deformation of the tire against the road surface while maintaining tire stability during use indicated in broken line arrows 26 in FIG. 1 of the drawings.

It will thus be seen that a new and novel exercise tire has been illustrated and described and it will be apparent to those skilled in the art that various changes and modifications may be made thereto without departing from the spirit of the invention.

Therefore, I claim:

1. An exercise bike tire comprising, an annular tire body, contoured depending annular sidewalls having tread beads, and a tread portion between said sidewalls, a plurality of interlinked deformable inserts within said tire body, said inserts infilled with non-compressible material, an air chamber between said inserts and said tire body,
said air chamber has means for infill air under pressure,
a plurality of atmospheric vents in said tire body in communication with said air chamber.

2. The exercise bike tire set forth in claim 1 further comprises said non-compressible infilled material imparts variable increase tire rotational resistance under an operational load.

* * * * *